Dec. 18, 1962  R. C. DEMI  3,069,089
THERMOSTATIC CONTROL DEVICE
Filed Dec. 15, 1958  2 Sheets-Sheet 2
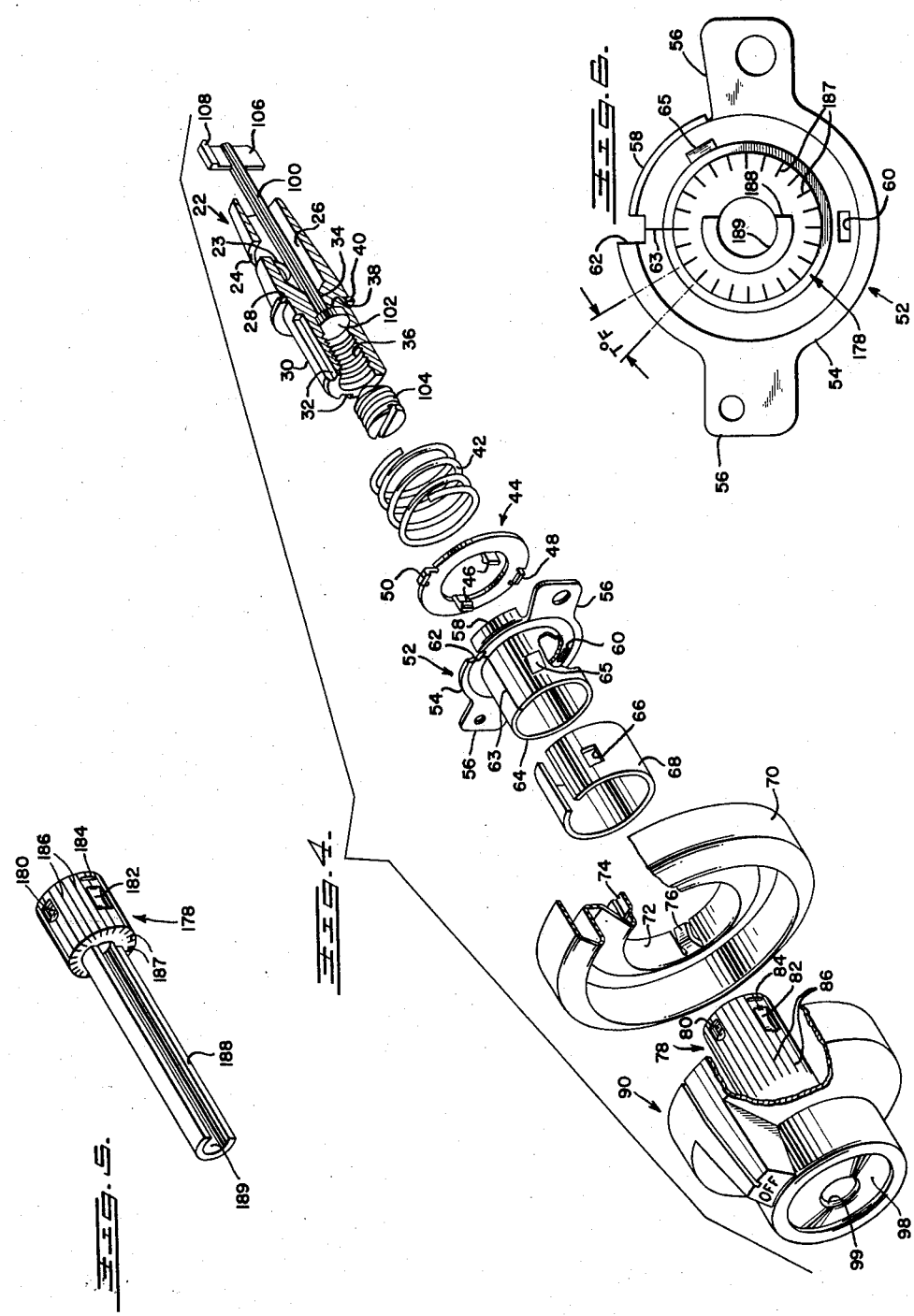

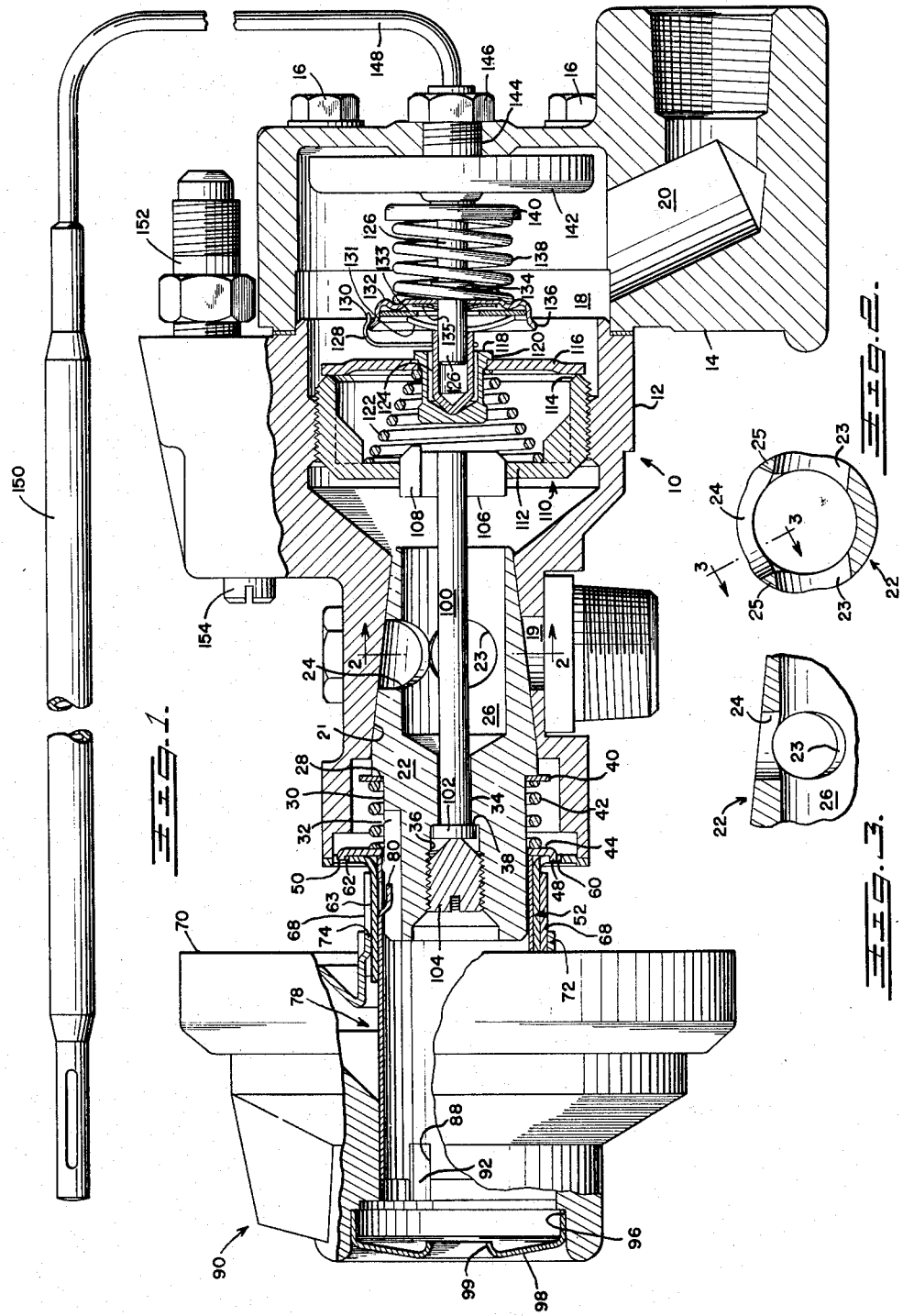

United States Patent Office 3,069,089
Patented Dec. 18, 1962

3,069,089
THERMOSTATIC CONTROL DEVICE
Roy C. Demi, Greensburg, Pa., assignor to Robertshaw-Fulton Controls Company, Richmond, Va., a corporation of Delaware
Filed Dec. 15, 1953, Ser. No. 780,476
6 Claims. (Cl. 236—99)

This invention relates to flow control devices and more particularly to a combined gas cock and valve for controlling and regulating thermostatically a flow of gaseous fuel to a burner.

An object of this invention is to facilitate the calibration of thermostatic control device.

Another object of this invention is to lock internally the valve driving mechanism of a thermostatic control device.

This invention has another object in that calibration of a thermostatic control device may be accomplished through its control knob without removing the control knob.

This invention is particularly applicable to the combination of a rotary shut-off cock and a reciprocating disc valve which is operable automatically by thermally responsive means to maintain a predetermined temperature in an appliance such as the oven of a gas range. In practicing this invention, a housing having an inlet and an outlet is provided with a regulating valve assembly including a valve member reciprocable in response to temperature variations and a valve seat threaded in said housing for movement to a position corresponding to a temperature setting. A gas cock is seated in the housing adjacent the inlet and is internally bored to carry a driving element for connection with regulating valve member. A locking screw is received in the outer end of the internally bored gas cock to lock the driving element with the gas cock for unitary movement. Calibration is effected by loosening the locking screw by means of a suitable tool inserted through the control knob to permit relative movement between the gas cock and the driving element.

Other objects and advantages of this invention will become apparent from the following description taken in connection with the accompanying drawings wherein:

FIG. 1 is a side elevation view, partly in section, of a thermostatic valve control embodying this invention;

FIG. 2 is a section of a detail taken on line II—II of FIG. 1 with adjacent elements removed;

FIG. 3 is a section view taken on line III—III of FIG. 2;

FIG. 4 is an exploded perspective view of a detail of FIG. 1;

FIG. 5 is a perspective view of a modified detail; and

FIG. 6 is an enlarged end view of FIG. 5 in assembled relationship.

As is illustrated in FIG. 1, the thermostatic control device includes a housing, indicated generally at 10, having a front casing 12 and a rear casing 14 secured together by suitable bolts 16. The interior of housing 10 is hollowed out to form a valve chamber 18 which establishes communication between an inlet port 19 in the front casing 12 and an outlet port 20 in the rear casing 14. The front casing 12 is open at one end and provided with a frusto-conical bore forming a tapered valve seat 21 which intersects the inlet port 19 and communicates with the valve chamber 18. A generally hollow shut-off cock or valve member 22 has a corresponding tapered surface for cooperation with the tapered valve seat 21.

A pair of similarly constructed ports 23 (FIG. 2) transversely arranged in the hollow valve member 22 are connected by a relatively larger elongated port 24 to permit a flow of gas from inlet 19 to an internal bore 26 of the valve member 22. The elongated port 24 is formed by a separate drilling operation on each end thereof so as to intersect the adjacent end wall of each port 23. As is illustrated in FIG. 2, only small tapering web portions 25 separate the elongated port 24 from each of the ports 23. With such a construction, the gas cock 22 will deliver maximum flow capacity without weakening the hollow part of the gas cock.

Oppositely disposed to the hollow bore 26, the shut-off cock 22 is reduced on its outer periphery to form an annular flange 28 and a cylindrical stem 30 extending through the opening in housing 10. The outer portion of stem 30 is provided with three longitudinally extending slots 32 (only two being shown in FIG. 4) radially spaced 90° from each other about the periphery of the valve stem 30.

The valve stem 30 is internally bored for communication with the hollow bore 26 by means of a first bore 34 and a counterbore 36 separated by an abutment shoulder 38. A washer 40 is mounted on the valve stem 30 and is biased against the shoulder 28 by means of a helical coil spring 42. The coil spring 42 is mounted in compression between the washer 40 and a ring-type washer 44 which is mounted on the stem 30 and is provided with a pair of oppositely disposed tabs 46 on its inner periphery which are received in the correspondingly disposed slots in the stem 30 for unitary rotation of the washer 44 and the valve stem 30. Ring washer 44 is provided with another pair of oppositely disposed perpendicularly bent lugs 48 and 50 located on its outer periphery and angularly displaced 90° from the inner peripheral tabs 46; the first lug 48 lies just inside the peripheral edge of ring washer 44 and the second lug 50 lies just outside of such peripheral edge.

A generally cylindrical guide cover 52 is open at both ends and an annular flange 54 on one end thereof is provided with a pair of oppositely disposed mounting ears 56 for securing the same to the front end of housing 10 by suitable fastening means. An arcuate portion 58 of the annular flange 54 is bent perpendicularly for abutment by the ring lug 50 to define the limits of rotation of the ring member 44 and the gas cock 22. The annular flange 54 is also provided with a pair of oppositely disposed rectangular openings 60 and 62 which respectively receive the lugs 48 and 50 of the ring washer 44. An indicia reference mark 63 is scribed on the cover 52 and is radially located equidistant between the radii defining the cover ears 56 and extends longitudinally along the exterior surface of the cover cylindrical portion 64. The forward end of the mark 63 extends radially inwardly across the edge of the cylindrical portion 64 and the rearward end extends radially outwardly across the annular flange 54 terminating at the edge thereof at the mid-point of the rectangular opening 62. The cylindrical portion of cover 52 has a rectangular bent-out section defining an aligning tab 65 which is received in a rectangular opening 66 in a split collar 68 for correctly positioning the collar 68 on the cover 52.

When the cover 52 is securely fastened to the housing 10, the coil spring 42, ring washer 44, and cover 52 are held in assembled relationship with the tabs 46 on the inner periphery of the ring washer 44 extending inwardly of the cylindrical portion 64 of cover 52. The split collar 68 is mounted on the exterior of the cylindrical portion 64 of cover 52 and provides an aligning and mounting means for a generally angular bezel 70. A centrally apertured mounting portion 72 of bezel 70 is provided with an inwardly bent aligning lug 74 which is received in the space forming the split in collar 68 and with an inwardly bent biasing lug 76 frictionally retains the bezel 70 in the correct axial position on the collar 68.

A hollow cylindrical operating sleeve 78 rotatably extends through the central aperture of the bezel mounting portion 72 and slightly spaced from its inner end is provided with a longitudinally extending inwardly bent tang 80 intermediately spaced in angular relationship between a pair of rectangular detents 82 (only one being shown). Between the end of sleeve 78 and the edge of each rectangular detent 82, the sleeve 78 is indented to form a keeper 84. Adjacent its inner end, the operating sleeve 78 is provided with calibrating indicia in the form of a plurality of longitudinally extending graduations 86 which are radially spaced about the outer surface of sleeve 78. The outer end of operating sleeve 78 is provided with a longitudinally extending rectangular slot 88 forming a mounting alignment for a control knob dial 90.

The control knob dial 90 is mounted on the outer end of operating sleeve 78 which frictionally fits within the through bore of dial 90. The sleeve 78 and the dial 90 are keyed for unitary rotation by means of a longitudinally extending rectangular projection 92 projecting radially inwardly from the wall defining the through bore and being received within the slot 88 of the sleeve 78. The outer end of dial 90 is counterbored to define a recess 96 which frictionally receives an insert cap 98. The insert cap 98 is provided with a central aperture 99 arranged on a common longitudinal axis with the operating sleeve 78 and the gas cock 22 to form tool insertion means during a calibrating operation.

During assembly, the dial 90 is frictionally mounted on the outer end of operating sleeve 78 which is inserted through the cylindrical portion 64 of cover 52 and its inner end encircles the outer portion of valve stem 30 in such a manner that its tang 80 is received in the intermediate slot 32 and its rectangular detents 82 are received in the respective slots 32. By depressing the dial 90 to its full extent, the tabs 46 on the ring washer 44 cooperate with the keepers 84 to retain the dial 90 and the sleeve 78 in assembled relationship with the gas cock 22. Because of the spacing of the tabs 46, the tang 80 and the detents 82 which interlock with the grooves 32 in the valve stem 30, the ring washer 44 and the operating sleeve 78 cannot be assembled incorrectly.

An operating shaft 100 extending through the gas cock 22 is slidably disposed within the valve stem bore 34 and has an enlarged end 102 disposed within valve stem bore 36 and an opposite end extending into valve chamber 18. The enlarged head 102 has an abutting surface which cooperates with the internal abutment shoulder 38 and such abutting surfaces are forced into abutting engagement by means of a set screw 104 which is threaded into the threaded bore 36 whereby the operating shaft 100 and the gas cock 22 are rotatable as a unit. A driving element 106 in the form of a flat rectangular plate is securely keyed intermediate its edges to the inner end of the operating shaft 100 and one of such edges is bent over to form an enlarged portion 108.

A portion of the internal wall defining the valve chamber 18 is provided with threads in which an externally threaded valve seat 110 is adjustably mounted. The valve seat 110 has a generally cup-shaped configuration with a central aperture in its bottom wall 112 which is formed with a pair of oppositely disposed slots (not shown) having different thicknesses so that the enlarged section 108 of drive element 106 can only be inserted in the larger of said slots. The mouth of the cup-shaped valve member 110 is reduced to form an angular valve seating surface 114.

A reciprocating disc-shaped valve member 116 is centrally apertured to be slidably mounted on a cup-shaped hub 118 which is outwardly flanged adjacent its open end to form an annular retainer 120 for the valve member 116. A conical helical load spring 122 has its smaller diameter portion encircling the hub 118 and is mounted in compression between the seat bottom wall 112 and the valve member 116 so that the same is always biased against the hub flange 120. A cup-shaped sleeve 124 is slidably received within the hub 118 and has its nose portion abutting the bottom wall of the hub 118. The open end of cup-shaped sleeve 124 is adapted to receive the free end of a power element shaft 126 and a spring clip 128 is resiliently mounted on the exterior of sleeve 124 by means of a looped portion on one end while its opposite end is provided with a projecting tongue 130.

An ambient temperature compensator in the form of a bimetallic disc 131 has a central aperture for mounting on shaft 126 with its central portion abutting the edge defining the open end of sleeve 124 and with its outer edges engaging a ring washer 133 to hold the same in abutting relation with a generally dish-shaped guide member 132. An annular shaft bearing 134 formed on the inner periphery of the apertured guide member 132 permits a slidable mounting of the same on the shaft 126. A lockwasher 135 engaging the guide member 132 is mounted on the shaft 126 in such a manner that it is prevented from moving from the right to the left on the shaft 126 as viewed in FIG. 1. The outer periphery of the guide member 132 radially projects into an outwardly extending annular flange 136 which the tongue engages to retain the sleeve 124 in assembled relationship on the power element shaft 126. A helical overtravel spring 138 encircles the shaft 126 and is mounted in compression between the guide 132 and a retainer 140 which is keyed to shaft 126 for movement therewith. The attaching end of shaft 126 is integrated with an expansible power element 142 which may be of any suitable type that is well known in the art. The power element 142 is mounted on the rear of casing 14 by means of a threaded stud 144 and a locknut 146. The stud 144 is provided with a central bore (not shown), one end of which communicates with the interior of the power element 142 while its other end receives the end of a capillary tube 148 which in turn is connected to a temperature sensing bulb 150 suitably positioned in a space to be temperature controlled.

The power element 142, the stud 144, the capillary tube 148, and the sensing bulb 150 constitute a closed system filled with an expansible fluid so that a variation of temperature sensed by the bulb 150 produces a corresponding expansion or contraction of the power element 142. A corresponding movement of the power element shaft 126 is effective to produce reciprocation of the valve member 116.

Adjacent the inner end of the gas cock 22, the front casing 12 is provided with a pair of small bores (not shown), one of which establishes a bypass passage to the outlet 20, the other of which establishes a pilot passage to the pilot outlet connector 152. The flows of fluid through these small bores are controlled by means of a pair of flow restrictors 154 (only one being shown) which separately intersect the bypass passage and the pilot passage for individual adjustment thereof. The pilot passage and the bypass passage are conventional features of the prior art and further description thereof is deemed unnecessary except to state that the pilot passage maintains a flow of fluid to a pilot burner and the bypass passage maintains a minimum flow to fluid to a main burner whenever the gas cock 22 is in an open position.

In order to place the thermostatic control device in operation, the control dial 90 is depressed inwardly against the bias of coil spring 42 whereby the lugs 48 and 50 are displaced axially from their slots 60 and 62, respectively, in the cover 52. After the initial depression of the dial 90 releases the interlocking feature, the dial 90 is rotated counterclockwise to a desired temperature setting causing rotation of the gas cock 22 and the drive plate 106 which in turn rotates the threaded valve seat 110 away from the valve member 116. Once the gas cock 22 is rotated to an ON position, one of its ports 23 or its port 24 or a combination thereof, depending upon the particular temperature setting, registers with the inlet 19 and the opening between the valve seat 110 and the valve member 116 permits the gas to flow to the outlet 20 to a main burner for ignition at that location.

As the temperature of the space being heated by the main burner approaches that for which the dial 90 has been set, the thermally responsive means moves the valve member 116 toward the valve seating surface 114. In order to maintain the temperature of the space at a predetermined setting, the thermally responsive means effects reciprocation of the valve member 116 in a manner that is well known in the art.

It is apparent from the relative sizes and designs of the load spring 122 and the overtravel spring 138, as viewed in FIG. 1, that the overtravel spring 138 exerts a greater force than that of the load spring 122; thus, the hub 118 and the valve member 116 mounted thereon move as a unit with the temperature responsive means against the bias of load spring 122 until the valve member 116 engages the valve seating surface 114 to cut off the flow of fluid to the outlet 20. In the event an excessive temperature is sensed by the bulb 150 after the valve member 116 is seated in response to thermostatic action, the additional expansion of power element 142 causes compression of the overtravel spring 138 so as not to subject the regulating valve 116 to undue stress. During such overtravel operation, the free end of power shaft 126 penetrates deeper into the sleeve 124.

When it is desired to turn off the thermostatic control device, the dial 90 is rotated clockwise to its OFF position. During such rotation, the coil spring 42 is biasing the washer lugs 48 and 50 against the cover flange 54 so that when the dial 90 reaches the OFF position, the washer lugs 48 and 50 automatically engage their respective slots 60 and 62 to lock the dial 90 in its OFF position. This clockwise rotation causes axial movement of the valve seat 110 whereby the valve seating surface 114 engages the regulating valve member 116 and simultaneously therewith the gas cock 22 is rotated to a position where its tapered portion closes off the inlet 19.

With the particular structural arrangement of this thermostatic control device, a simplified calibrating operation is permissible which is accomplished by placing the temperature sensing bulb 150 in a bath having a predetermined temperature, for example 400° F.; the dial 90 is then rotated counterclockwise until the valve seating surface 114 is in light contact with the regulating valve disc 116. With the dial 90 held firmly so as to prevent rotation thereof and of gas cock 22, a screwdriver is inserted through the aperture 99 of the insert cap 98 and operably engages the set screw 104. The set screw 104 is then loosened and thus releases the rotational drive between the gas cock 22 and the operating shaft 100. The dial 90 is then rotated either clockwise or counterclockwise, as the case may be, to its 400° F. temperature setting so as to correspond to the 400° F. temperature of the bath; during this rotation the dial 90, sleeve 78, drive washer 44 and gas cock 22 rotate as a unit relative to the shaft 100, which had been released from the gas cock 22 by the loosening of the set screw 104. Since the shaft 100 does not rotate, the movable valve seat 110 remains in its contacting position relative to the regulating valve disc 116. In order to complete the calibrating operation, the dial 90 is held firmly to prevent rotation of the dial 90, sleeve 78, drive washer 44, and gas cock 22 while the set screw 104 is turned tight so as to effect the rotational drive between the gas cock 22 and the operating shaft 100. In some installations, it may be required that the insert cap 98 be a solid member with no central aperture; accordingly, the insert cap 98 is removed for calibration purposes and then replaced after the calibration is completed.

This thermostatic control device also includes a second calibration feature which is accomplished by placing the bulb 150 in a bath of a predetermined temperature, such as 400° F., and then rotating dial 90 to a position where the valve seating surface 114 is in light contact with the regulating valve disc 116. When the surface 114 and the disc 116 are in light contact, the temperature setting indicated by the dial 90 is compared with the 400° F. temperature of the bath and the difference is noted. This difference is the value of the miscalibration which is to be adjusted. The dial 90 is then removed from the operating sleeve 78 and bezel 70 may also be removed if desired. It should be noted that with bezel 70 removed, the entire reference mark 63 on the cover 52 is visible because it is located in the center of the split of collar 68. However, bezel removal is not necessary because when in its proper position, the outer portion of reference mark 63 is visible including the end of mark 63 which is disposed on the outer edge of the cover cylindrical portion 64.

Continuing with the calibrating operation, the operating sleeve 78 is held firmly so as not to rotate and a screwdriver engages the set screw 104 to loosen the same. Loosening of the set screw 104 disengages the rotational drive between the gas cock 22 and the operating shaft 100. The sleeve 78 is then rotated either clockwise or counterclockwise, as the case may be, an angular distance corresponding to the noted number of degrees of miscalibration. For instance, if each graduation 86 is designed to represent a 10° F. temperature variation and the noted miscalibration is also a 10° F. temperature difference, the sleeve 78 is rotated an angular distance of one graduation 86 relative to the fixed reference mark 63 on the cover 52. During such rotation, the sleeve 78, drive washer 44, and gas cock 22 rotate as a unit relative to the shaft 100, which had been released from the gas cock 22 by the loosening of the set screw 104. Since the shaft 100 does not rotate, the movable valve seat 110 remains in its contacting position relative to the regulating valve disc 116. In completing the calibration operation, the sleeve 78 is held firmly to prevent rotation of the sleeve 78, drive washer 44, and gas cock 22 while the set screw 104 is then tightened, the dial 90 is replaced and the calibration is completed.

FIGS. 5 and 6 show a modification of the operating sleeve for use with a D-shaped socketed control dial. As is illustrated in FIG. 5, the operating sleeve 178 is generally cup-shaped, having a cylindrical portion and a central aperture in its bottom wall. The sleeve 178 is provided with a longitudinally extending inwardly bent tang 180 intermediately spaced in angular relationship between a pair of rectangular detents 182 (only one being shown). Between the end of sleeve 178 and the edge of each rectangular detent 182, the sleeve 178 is dented inwardly to form a keeper 184. Calibrating indicia in the form of a plurality of longitudinally extending graduations 186 are radially spaced about the outer surface of the cylindrical portion of sleeve 178, which graduations terminate in radially extending graduations 187 formed on the bottom wall of the cup-shaped sleeve 178. An operating stem 188, having a D-shaped cross-section, is provided with an axial passageway 189 which is concentric with the opening in the bottom wall of the cup-shaped sleeve member 178. One end of the D-shaped stem 188 is securely fastened to the bottom wall of the cup-shaped sleeve member 178 while its opposite end receives a conventional control dial having a D-shaped socket.

As is illustrated in FIG. 6, the indicia end marks 187 cooperate with the end of reference mark 63 on the edge of the cover cylindrical portion 64 so that it is not necessary to remove bezel 70 or the split collar 68 during the calibrating operation. Inasmuch as the operation of the device of FIGS. 5 and 6 is similar to that described above relative to FIG. 1, reference may be made thereto for further description of the operation of the device of FIGS. 5 and 6.

Inasmuch as the above description and the drawings are subject to various changes in structural details and reversals of parts, it is intended that the foregoing description and drawings be interpreted as illustrative and not in a limiting sense.

I claim:

1. In a control device, the combination comprising a housing having an opening, an inlet and an outlet, first valve means in said housing movable between a plurality of positions for controlling a flow of fluid into said housing and including a bored stem portion extending through said opening, second valve means in said housing movable between a plurality of positions for regulating a flow of fluid out of said housing, an apertured member surrounding said bored stem portion and secured to said housing adjacent said opening, a sleeve member extending into said apertured member and being operatively connected to said bored stem portion for moving said first valve means, an element carried by said first valve means having one part terminating within said bored stem portion and another part operatively connected to said second valve means, locking screw means concentrically carried by the bored stem portion of said first valve means and abutting said one part of said element and locking said element to said first valve means for unitary movement whereby movement of said first valve means by said sleeve member causes simultaneous movement of said second valve means, and cooperating indicia on said sleeve and said apertured members to facilitate calibration of the control device.

2. In a thermostatic control device, the combination comprising a housing having an opening, an inlet and an outlet, control valve means movably disposed adjacent said inlet for controlling a fluid flow into said housing and having a bored stem portion extending through said opening, a sleeve member operatively connected to said bored stem portion for moving said control valve means, regulating valve means movably disposed in said housing for regulating a fluid flow out of said housing, thermally responsive means including a power element operatively connected to said regulating valve means for moving the same in response to temperature variations, a cover element secured to said housing adjacent its opening, a shaft member carried by said control valve means having one end terminating within said bored stem portion and being operatively connected to said regulating valve means, locking screw means carried by said control valve means and being operatively disposed within said bored stem portion, said locking screw means being operative to lock said shaft member to said bored stem portion for simultaneously positioning said control valve means and said regulating valve means and operative to release said shaft member from said bored stem portion permitting calibrating adjustment of said control valve means independently of said regulating valve means, and cooperating indicia on said sleeve and said cover to facilitate calibration when said locking means is released and said control valve means is movable relative to said shaft member.

3. In a thermostatic control device, the combination comprising a housing having an opening, an inlet and an outlet, a valve chamber in said housing disposed between said inlet and outlet, a movable valve seat disposed in said chamber, a valve member cooperating with said seat and being movable relative thereto to regulate a flow of fluid to said outlet, thermally responsive means including a power element operatively connected to said valve member for moving the same in response to temperature variations, a fixed valve seat in said housing adjacent said inlet, a hollow valve member rotatably disposed in said fixed valve seat and having port means adapted to register with said inlet, said hollow valve member including a bored stem extending through the opening in said housing, an abutment shoulder in said bored stem, an apertured cover for said stem secured to said housing, an operating shaft having one end terminating within said bored stem and having an opposite end operatively connected to said movable valve seat, an abutting surface on the one end of said operating shaft and cooperating with said abutment shoulder, locking screw means threadedly disposed in said bored stem and abuttingly engaging the one end of said operating shaft for locking said abutting surface to said abutment shoulder to effect simultaneous movement of said movable valve seat and said hollow valve member, a sleeve member extending into said apertured cover and being operatively connected to said stem for rotating said hollow valve member, first indicia means on said apertured cover, and second indicia means on said sleeve member and cooperating with said first indicia means to indicate an adjustment value for calibration purposes.

4. The combination as recited in claim 3 wherein said sleeve member comprises a hollow cylinder and said second indicia means are formed by longitudinal graduations on a portion of said cylinder, and a control knob is mounted on said cylinder for manual operation to effect selective positioning of said movable sleeve member.

5. The combination as recited in claim 3 wherein said sleeve member comprises a cup-shaped element having a cylindrical portion and an apertured bottom wall, a longitudinally bored shaft element secured to said bottom wall, and said second indicia means are formed by graduations extending longitudinally on the cylindrical portion and radially on the bottom wall, and a control knob is mounted on said longitudinally bored shaft element for manual operation to effect selective positioning of said movable sleeve member.

6. The combination as recited in claim 3 wherein a control dial is mounted on said sleeve element for manual operation to effect selective positioning of said movable valve seat, and said control dial is provided with aperture means defining tool insertion means whereby said locking means is releasable for calibration purposes with said control dial remaining mounted on said sleeve element.

References Cited in the file of this patent

UNITED STATES PATENTS

| | | |
|---|---|---|
| 2,153,886 | Grayson | Apr. 11, 1933 |
| 2,303,011 | Weber et al. | Nov. 24, 1942 |
| 2,746,686 | Loveland | May 22, 1956 |
| 2,807,432 | Eskin | Sept. 24, 1957 |